(12) United States Patent
Bills et al.

(10) Patent No.: US 9,840,252 B2
(45) Date of Patent: Dec. 12, 2017

(54) SYSTEM AND METHOD FOR VEHICLE ASSISTED RESPONSE TO ROAD CONDITIONS

(71) Applicant: INTERNATIONAL BUSINESS MACHINES CORPORATION, Armonk, NY (US)

(72) Inventors: Tierra Bills, Nairobi (KE); Joel Branch, Hamden, CT (US); Reginald Bryant, Nairobi (KE); David Kaguma, Nairobi (KE); Michiaki Tatsubori, Kanagawa (JP); Aisha Walcott, Nairobi (KE); John Mbari Wamburu, Nairobi (KE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/137,447

(22) Filed: Apr. 25, 2016

(65) Prior Publication Data
US 2017/0158191 A1 Jun. 8, 2017

(30) Foreign Application Priority Data
Dec. 3, 2015 (KE) .......................... KE/P/2015/2384

(51) Int. Cl.
| | |
|---|---|
| *B60W 30/02* | (2012.01) |
| *B60W 10/06* | (2006.01) |
| *B60W 10/22* | (2006.01) |
| *B60W 50/14* | (2012.01) |
| *G05D 1/02* | (2006.01) |

(52) U.S. Cl.
CPC .......... *B60W 30/025* (2013.01); *B60W 10/06* (2013.01); *B60W 10/22* (2013.01); *B60W 50/14* (2013.01); *G05D 1/0238* (2013.01); *G05D 1/0278* (2013.01); *B60W 2050/146* (2013.01); *B60W 2550/14* (2013.01); *B60W 2710/22* (2013.01)

(58) Field of Classification Search
CPC .............. B60W 30/025; B60W 30/143; G06Q 30/0266; H04W 76/007
See application file for complete search history.

(56) References Cited

U.S. PATENT DOCUMENTS

| | | | |
|---|---|---|---|
| 8,134,478 B2 | 3/2012 | Denaro | |
| 8,258,981 B2 | 9/2012 | Turnbull | |
| 9,626,870 B2* | 4/2017 | Fureder | .................... G08G 1/22 |
| 2012/0214478 A1* | 8/2012 | Jodlauk | ............... H04W 76/007 455/422.1 |
| 2016/0258777 A1* | 9/2016 | Bodake | ................. G01C 21/367 |
| 2016/0280224 A1* | 9/2016 | Tatourian | ............. B60W 30/143 |
| 2017/0032402 A1* | 2/2017 | Patsiokas | ............ G06Q 30/0266 |

FOREIGN PATENT DOCUMENTS

| | | |
|---|---|---|
| EP | 2836037 A1 | 2/2015 |
| GB | 2472969 B | 6/2011 |

* cited by examiner

*Primary Examiner* — Yuri Kan
(74) *Attorney, Agent, or Firm* — Louis J. Percello; Otterstedt, Ellenbogen & Kammer, LLP

(57) ABSTRACT

The invention pertains to methods and systems for assisting drivers, automated driver systems, and other vehicle operators with detection, avoidance, and mitigation of the hazards posed by aberrations in roadways. The invention provides complete or partial relief to vehicles traveling on roadways in a variety of conditions.

20 Claims, 5 Drawing Sheets

SYSTEM AND METHOD FOR VEHICLE ASSISTED RESPONSE TO ROAD CONDITIONS

This application claims priority to the Kenyan provisionally filed application number KE/P/2015/2384

FIELD OF THE INVENTION

In embodiments, the technical field of the invention is a method and system to assist drivers and vehicles with avoiding or reducing the hazard of road aberrations.

BACKGROUND

In developing countries, the number of road fatalities is often two times higher than that of high-income countries on average. Also, many developing countries are resource constrained and have little or no data collection sources to understand the roads and traffic. As a result, many roads are poorly maintained, and have little or no signage, with resulting negative impacts on traffic flow.

Poor road conditions impact driver-vehicle controllability, comfort, and safety. These symptoms are exacerbated given different context such as road geometry, weather, and time of day. For example, when it rains potholes and speed bumps can appear hidden creating a hazard for drivers. Moreover, there is little or no labelling or signage of road events (eg. Speed bumps).

Certain systems have been developed to address the above problems, with varying or limited success. The goals of such systems include: monitoring road surface conditions, road surface condition detection systems, methods for assisting drivers to identify road bumps, methods for improving visibility in bad weather, and methods for assisting drivers in detecting objects. However, few systems are successful at these goals, and combining such goals into a single system is even more challenging.

SUMMARY OF THE INVENTION

In an aspect, then, there is provided herein a method comprising: communicating to a vehicle a probable geo-location of a road aberration and a recommended vehicle action for traversing the road aberration, wherein the communicating causes an action selected from: a change in the vehicle operation; a physical change to the vehicle; and a change in a driver alert system within the vehicle. In embodiments:

the probable geo-location for the road aberration is determined from aggregated sensor data, and the recommended vehicle action is determined from aggregated sensor data; and the probable geo-location for the road aberration is determined from aggregated sensor data, and the recommended vehicle action is determined from aggregated sensor data, and wherein the aggregated sensor data comprises geo-location and vehicle action data from a plurality of vehicles, each vehicle having encountered the road aberration.

In an aspect is a method comprising: receiving, by a computer system via a network, sensor data pertaining to a road segment from a plurality of vehicles, wherein the road segment comprises a road aberration and wherein the sensor data from each of the plurality of vehicles corresponds to an encounter of the vehicle with the road aberration, and wherein the sensor data comprises geo-location data and vehicle action data; determining a probable geo-location for the road aberration from the aggregated sensor data; determining a recommended vehicle action for the road aberration from the aggregated sensor data; and communicating to a vehicle positioned in the road segment or adjacent to the road segment the determined probable geo-location of the road aberration and the determined recommended vehicle action. In embodiments:

the method further comprises adding the determined probable geo-location for the road aberration and the determined recommended vehicle action to a digital map comprising the road segment;

the communicating causes an action selected from: a change in the vehicle operation; a physical change to the vehicle; and a change in a driver alert system within the vehicle;

the communicating causes a change in a driver alert system within the vehicle, wherein the display is a heads-up display and the change comprises displaying the determined probable geo-location of the road aberration and the determined recommended vehicle action;

the communicating causes a change in the vehicle operation, and wherein the vehicle takes an action consistent with the determined recommended vehicle action;

the communicating causes a physical change to the vehicle, and wherein the physical component is the suspension system of the vehicle;

the method further comprises characterizing and labeling the road aberration according to the sensor data;

the sensor data for each of the plurality of vehicles is obtained from a mobile device disposed within the vehicle;

the sensor data further comprises vehicle type information;

the method further comprises adding the determined probable geo-location for the road aberration and the determined recommended vehicle action to a digital map comprising the road segment, and wherein the communicating causes an action selected from: a change in the vehicle operation; a physical change to the vehicle; and a change in a driver alert system within the vehicle;

the method further comprises characterizing and labeling the road aberration according to the sensor data and wherein the communicating causes an action selected from: a change in the vehicle operation; a physical change to the vehicle; and a change in a driver alert system within the vehicle;

the sensor data further comprises vehicle type information and wherein the communicating causes an action selected from: a change in the vehicle operation; a physical change to the vehicle; and a change in a driver alert system within the vehicle;

the determined recommended vehicle action is vehicle type dependent, and wherein the communicating is vehicle type dependent; and the sensor data further comprises vehicle type information, and wherein the method further comprises adding to a digital map the determined probable geo-location for the road aberration, and the determined recommended vehicle action indexed by vehicle type.

In an aspect is a method comprising: communicating to a vehicle positioned in a road segment a probable geo-location of a road aberration and a recommended vehicle action, the road aberration being located in the road segment or adjacent to the road segment, the probable geo-location of the road aberration and the recommended vehicle action having been calculated from sensor data from a plurality of vehicles. In embodiments:

the method further comprises determining a feature selected from vehicle type, vehicle age, vehicle performance capability, driver age, driver skill, and environmental situation, and further comprising matching the recommended vehicle action with the determined feature;

the method further comprises determining the vehicle type and matching the recommended vehicle action with the determined vehicle type; and each of the plurality of vehicles is characterized by vehicle type, and wherein the method comprises forming a digital map of road aberrationes and corresponding recommended vehicle actions from sensor data received from the plurality of vehicles, and wherein the communicating is initiated when the vehicle's position drops below a threshold distance from the road aberration.

In an aspect is a computer system, comprising: a processor; and a memory coupled to the processor, the memory configured to store program instructions executable by the processor to cause the computer system to carry out a method as above. In embodiments:

the system further comprises a digital map, and wherein the computer system is configured to add the determined probable geo-location for the road aberration and the determined recommended vehicle action to the digital map, and wherein the communication is configured to cause an action selected from: a change in the vehicle operation; a physical change to the vehicle; and a change in a driver alert system within the vehicle; and the system is further configured to characterize and label the road aberration according to the sensor data and wherein the communication is configured to cause an action selected from: a change in the vehicle operation; a physical change to the vehicle; and a change in a driver alert system within the vehicle.

These and other aspects of the invention will be apparent to one of skill in the art from the description provided herein, including the examples and claims.

DETAILED DESCRIPTION OF VARIOUS EMBODIMENTS

Figure 1:
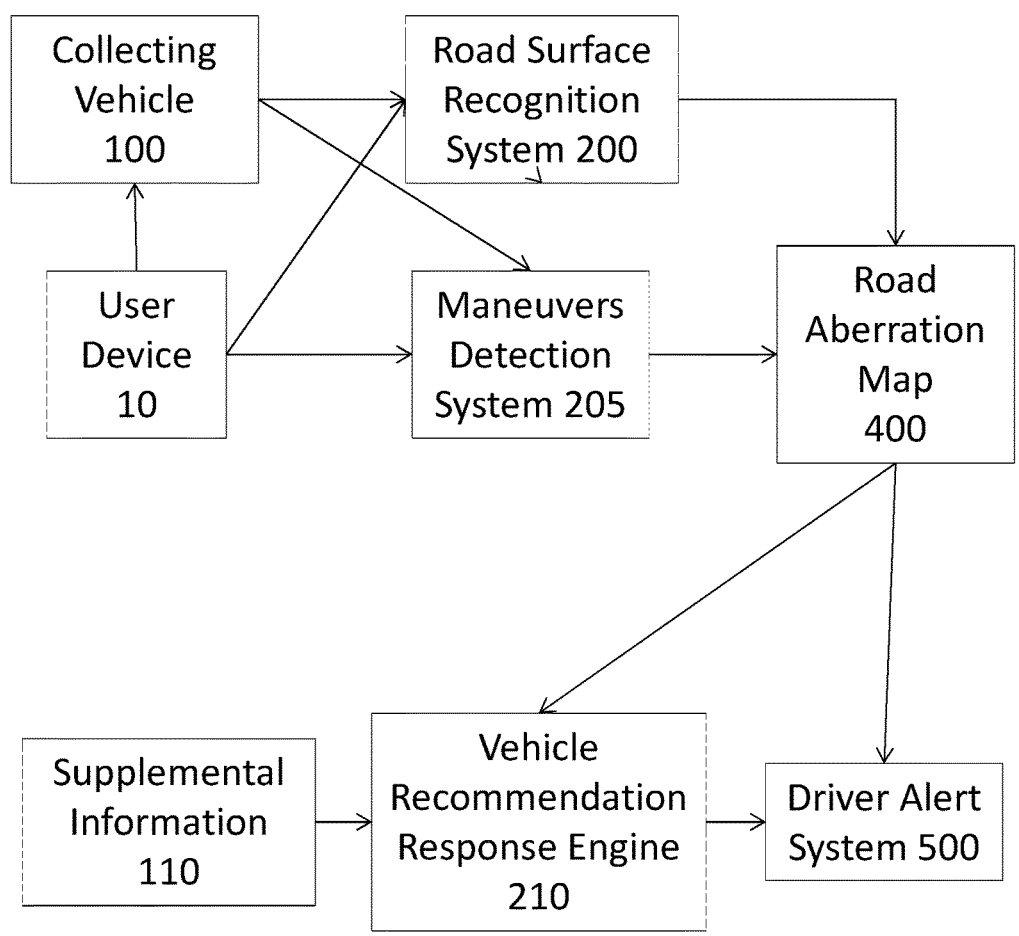
FIG. 1 provides a flow chart for an embodiment of the systems described herein.

In an aspect, then, there is provided herein a method comprising: communicating to a vehicle a probable geo-location of a road aberration and a recommended vehicle action for traversing the road aberration, wherein the communicating causes an action selected from: a change in the vehicle operation; a physical change to the vehicle; and a change in a driver alert system within the vehicle. In an aspect is a computer system, comprising: a processor; and a memory coupled to the processor, the memory configured to store program instructions executable by the processor to cause the computer system to carry out a method as above.

In an aspect is a method comprising: receiving, by a computer system via a network, sensor data pertaining to a road segment from a plurality of vehicles, wherein the road segment comprises a road aberration and wherein the sensor data from each of the plurality of vehicles corresponds to an encounter of the vehicle with the road aberration, and wherein the sensor data comprises geo-location data and vehicle action data; determining a probable geo-location for the road aberration from the aggregated sensor data; determining a recommended vehicle action for the road aberration from the aggregated sensor data; and communicating to a vehicle positioned in the road segment or adjacent to the road segment the determined probable geo-location of the road aberration and the determined recommended vehicle action. In an aspect is a computer system, comprising: a processor; and a memory coupled to the processor, the memory configured to store program instructions executable by the processor to cause the computer system to carry out a method as above.

In an aspect is a method comprising: communicating to a vehicle positioned in a road segment a probable geo-location of a road aberration and a recommended vehicle action, the road aberration being located in the road segment or adjacent to the road segment, the probable geo-location of the road aberration and the recommended vehicle action having been calculated from sensor data from a plurality of vehicles. In an aspect is a computer system, comprising: a processor; and a memory coupled to the processor, the memory configured to store program instructions executable by the processor to cause the computer system to carry out a method as above.

The above methods and systems are described in more detail in the following paragraphs, with particular reference to the Figures provided. It will be appreciated, however, that such Figures are meant to be exemplary and not limiting, and are provided only for the purpose of assisting the reader in understanding various aspects of the invention. Throughout the description of the figures, certain components or modules or data structures may be said to be part of "the system" even where a system is not labelled in the figure. By this is meant that the component or module or data structure resides on a system (e.g., a server) that is used to carry out the methods described With reference to FIG. 1, a collecting vehicle 100 collects information pertaining to road aberrations encountered by the vehicle, including information regarding manoeuvres used by the vehicle to avoid or otherwise deal with the aberration.

Throughout this disclosure, a road aberration is any departure from a normally-expected smooth pavement road. A road aberration is defined as a static or quasi-static occurrence along a road or adjacent to the road which could effect/effects traffic flow. A road aberration may also be known as a roadway aberration or a road distress. Some sample road aberrations: speed bump; pothole; edge unravelling; road construction; accumulation of water on the side of the road which results in the narrowing of the usable road surface; a fallen tree, road surface change from pavement to cobblestone; and a railroad track crossing.

The collecting vehicle 100 can be any type of vehicle, such as a passenger vehicle, service vehicle, cargo or passenger truck, van, or bus, emergency vehicle (ambulance, fire truck, etc.), motorcycle, or three-wheel taxi or other small vehicle. The collecting vehicle may be fitted with one or more sensors and one or more built-in transceivers for communicating with a server (e.g., a system according to the invention) via a network. Alternatively or in addition, the collecting vehicle may have disposed therein a user device 10 suitable for collecting data and/or acting as a transceiver to send and receive information to/from a server (e.g., a system according to an invention) via a network. Throughout this disclosure, the term "sensor" is intended to include any of the following or other sensors that may be suitable for the methods herein: accelerometer, gyroscope, magnetometer, Global Positioning System (GPS) (latitude, longitude, accuracy, etc.), and a clock, as well as combinations and variations of such sensors.

In embodiments, user device 10 is selected from a multipurpose mobile device such as a mobile phone (e.g., a simple phone or a smartphone), tablet, laptop, or other mobile device. Alternatively user device 10 can be a dedicated device that is purpose-built for carrying out the functions of data collection, data transmission, data reception, and the like in a vehicle.

In embodiments, user device 10 provides information to collecting vehicle 100, which then transmits the information via a network to road surface recognition system 200 and/or manoeuvres detection system 205, both of which are part of a system according to the invention. Alternatively, user device 10 can transmit the information directly, as shown in FIG. 1. It will be appreciated that, although FIG. 1 shows the information from the collecting vehicle 100 and/or user device 10 reaching road surface recognition system 200 and manoeuvres detection system 205 directly, such information may first pass through processing units (not shown) that are also part of the system according to the invention and are used as appropriate to catalogue, attach metadata, and/or reformat the received information. Still referring to FIG. 1, road surface recognition system 200, manoeuvres detection system 205, vehicle recommendation response engine 210, and road aberration map 400 collectively (along with other possible components) form a system according to the disclosure (labelled in other figures as system 1000). The inputs to the system are selected from collecting vehicle 100, user device 10, and supplemental information 110, among other possible inputs.

Figure 2:
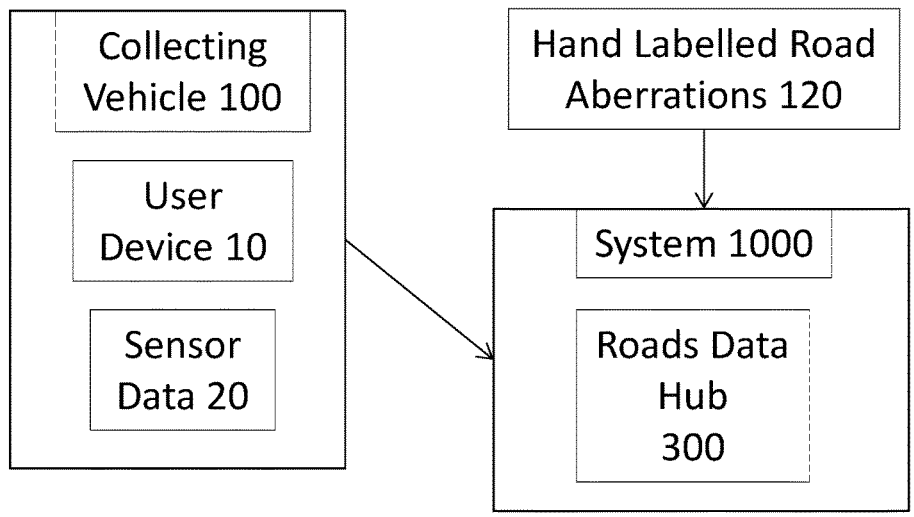
FIG. 2 provides a flow chart for building a roads data hub according to an embodiment of the disclosure.

The information collected by user device 10 and/or collecting vehicle 100 includes sensor information from sensors on-board the collecting vehicle and/or disposed within user device 10. This includes data from one or more sensors such as those mentioned herein (accelerometer, etc.), and the information is transmitted to system 1000 as shown in FIG. 2. Such sensor information is, in embodiments, labelled/associated with metadata such as GPS coordinates (latitude, longitude, accuracy), and a time stamp.

Figure 6:
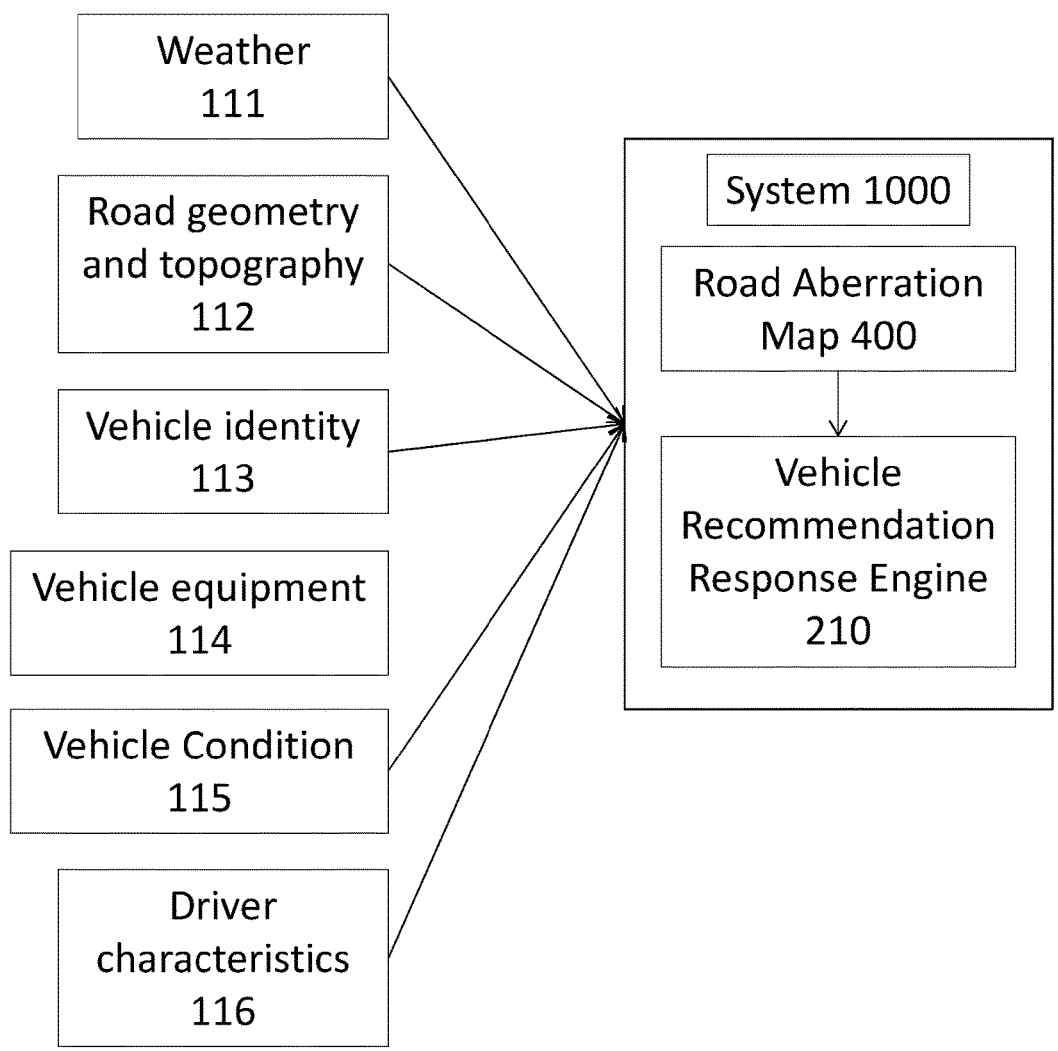
FIG. 6 provides a flow chart showing various input to a vehicle recommendation response engine according to an embodiment of the disclosure.

Additional information may also be transmitted to system 1000 from user device 10 and/or collecting vehicle 100, such information being about the identity of one or more of the user device, the collecting vehicle, or the driver of the collecting vehicle. For example, the additional information may include any of the following, as shown in FIG. 2 and FIG. 6: vehicle identity 113 (e.g., make, model, etc.), vehicle equipment 114 (e.g., whether 2- or 4-wheel drive, etc.), vehicle age (not shown), vehicle condition 115 (e.g., whether well-maintained, poor condition, etc.), vehicle purpose (not shown) (e.g., emergency vehicle, passenger vehicle, delivery vehicle, etc.), user device identity (not shown), driver identity (not shown), driver characteristics 116 (e.g., professional driver, trained driver, average driver, etc.), etc., or combinations thereof. As shown in FIG. 1, system 1000 (including a specific component thereof, such as the vehicle recommendation response engine 210 shown in FIG. 1) can also receive supplemental information 110, and hand labelled road aberrations 300. Supplemental information 110 may include context information such as shown in FIG. 6, including weather 111, road geometry and topography 112, and a time of day (not shown).

Still with reference to FIG. 2, all of the information mentioned in the previous paragraphs are received by system 1000 and processed to form a roads data hub 300, which is a component of system 1000. The roads data hub (or some other component of system 1000) ensures that incoming sensor data is properly labelled with GPS coordinates, and then cross-references the GPS coordinates with appropriate maps in order to associate a road segment to the data. As used herein, the term "road segment" means a segment of road of predefined length, orientation, and geo-location. For example, the roads of a roadmap can be segmented into road segments, with each road segment being assigned a unique segment ID. Each road segment can be of any desired length, and such lengths can be uniform or not uniform. As shown in FIG. 2, roads data hub 300 can also obtain aberration location and labelling data from manual input, shown as hand labelled road aberrations 120.

Figure 3:
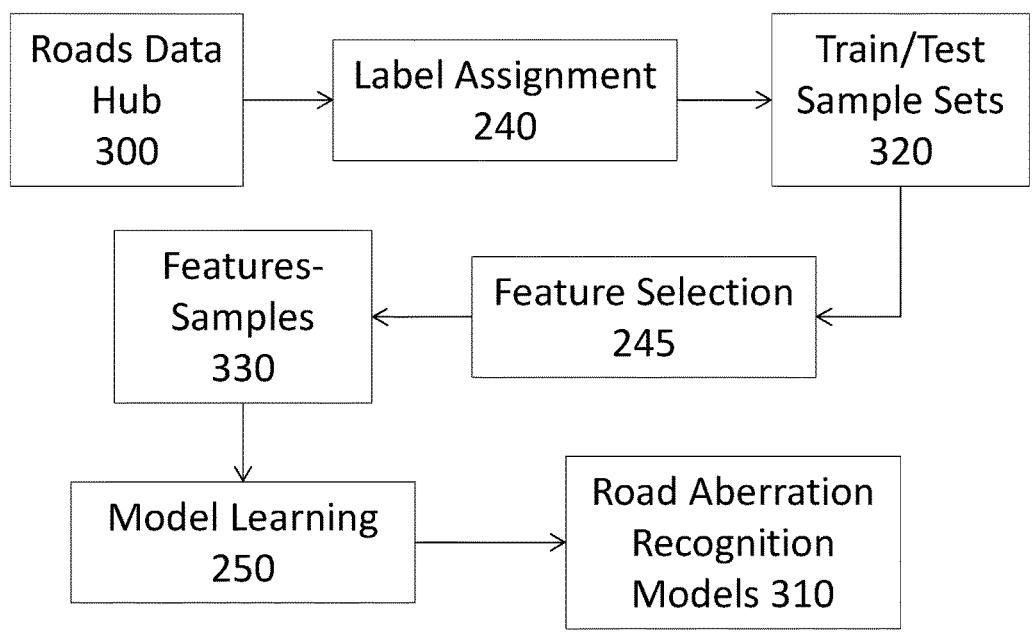
FIG. 3 provides a flow chart for using a roads data hub to develop a road aberration recognition model according to an embodiment of the disclosure.

With reference to FIG. 3, from roads data hub 300, the system (not labelled) proceeds through a variety of steps to arrive at road aberration recognition models 310. Data from the roads data hub 300 may include sensor traces by vehicle type and user device type (including accelerometer, latitude, longitude, accuracy, and time data for the sensor traces). This information is passed to label assignment module 240, which assigns a label to the aberration based on the sensor data (e.g., pothole, speed bump, etc.). The data (e.g., labels, sensor traces, etc.) then passes to a model builder referred to as train/test sample sets 320. The train/test sample sets 320 aggregates the data and sends data (vehicle type, user device type, labels, sensor traces, etc.) to feature selection module 245. Feature selection module 245 then extracts or identifies or labels features from the data, and sends the features to features samples 330. Features samples 330 stores known features and their characteristics. Data from features samples 330 (e.g., features, sample IDs, training, testing data) is sent to model learning module 250 in order for training, testing and cross validation of the data. The model and other data (feature set, training set ID, testing set ID, confusion matrix, cross validation method, cross validation results, etc.) are then sent to road aberration recognition models 310. The end result of the process outlined in FIG. 3 is a database of model road aberrations suitable for recognition by the system of newly reported aberrations.

Figure 4:
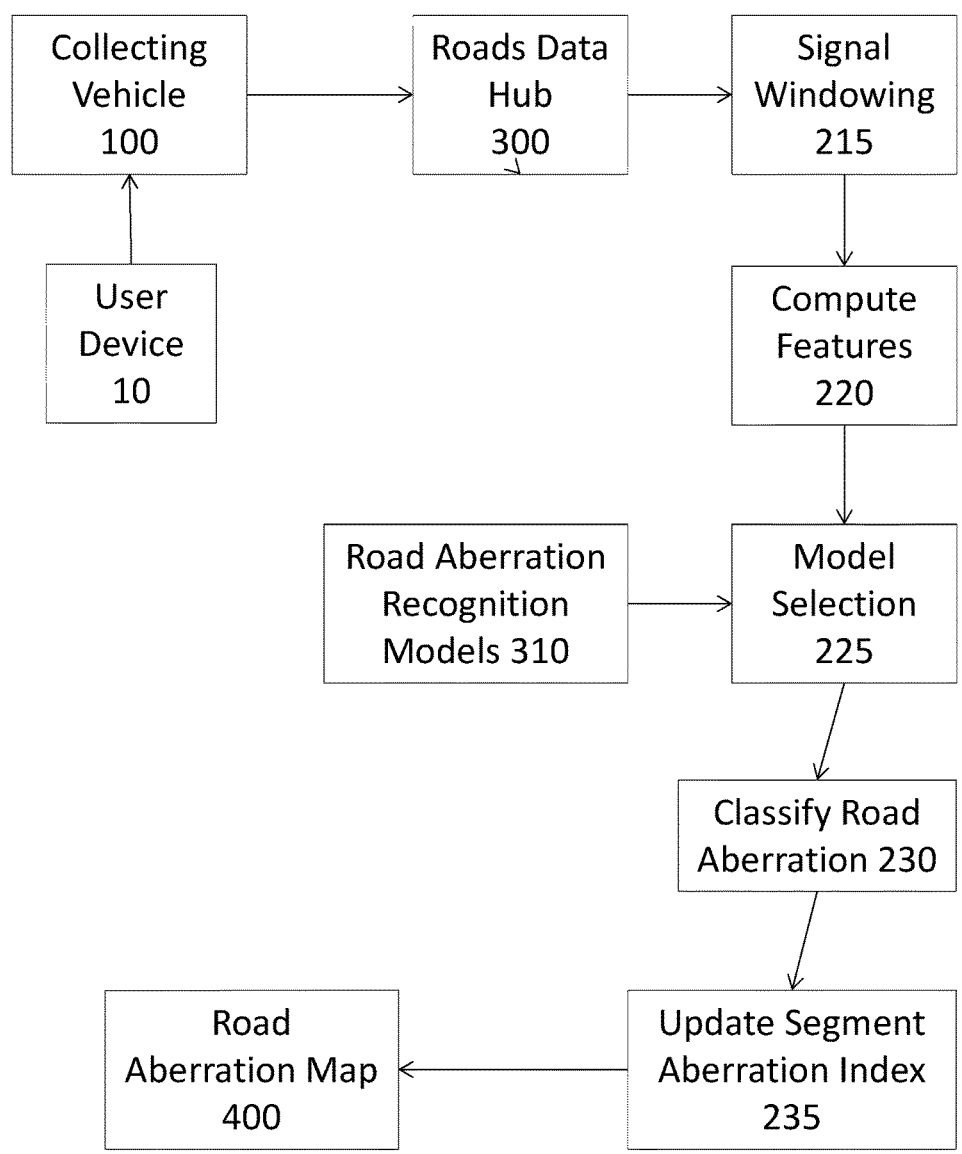
FIG. 4 provides a flow chart for building a roads aberration map according to an embodiment of the disclosure.

With reference to FIG. 4, there is shown the process of creating a road aberration map 400. As mentioned previously, collecting vehicle 100 provides data (which may optionally be obtained from user device 10) to the roads data hub 300. Roads data hub 300 passes information (vehicle type, user device type, road segment ID, sensor traces, etc.) to the signal windowing module 215. Signal windowing module 215 passes information (time window, sensor traces, clock time, vehicle type, user device type, etc.) to the compute features module 220. Compute features module 220 passes information (features, vehicle type, and user device type) to the model selection module 225. Model selection module 225 also receives model information from road aberration recognition models structure 310. The features and model are then sent to the classify road aberration module 230 (also known as a recognizer module). The classify road aberration module 230 sends label, road segment ID, and accuracy information to an update segment aberration index module 235. The update segment aberration index module 235 sends road segment ID and aberration index information to the road aberration map 400.

Road aberration map 400 contains the expected location of road aberrations and, for each aberration, a recommended vehicle action. As more data is collected for a specific aberration (i.e., more collecting vehicles encounter the aberration), it is expected that the specific location of the aberration and the recommended vehicle action will be adjusted according to the aggregated data. In this way, a geo-location of the road aberration that is far more accurate than the GPS coordinates of a single encounter can be developed over time based on numerous encounters by different collecting vehicles. Furthermore, the recommended vehicle action can be adjusted for a variety of vehicles, drivers and conditions.

Figure 5:
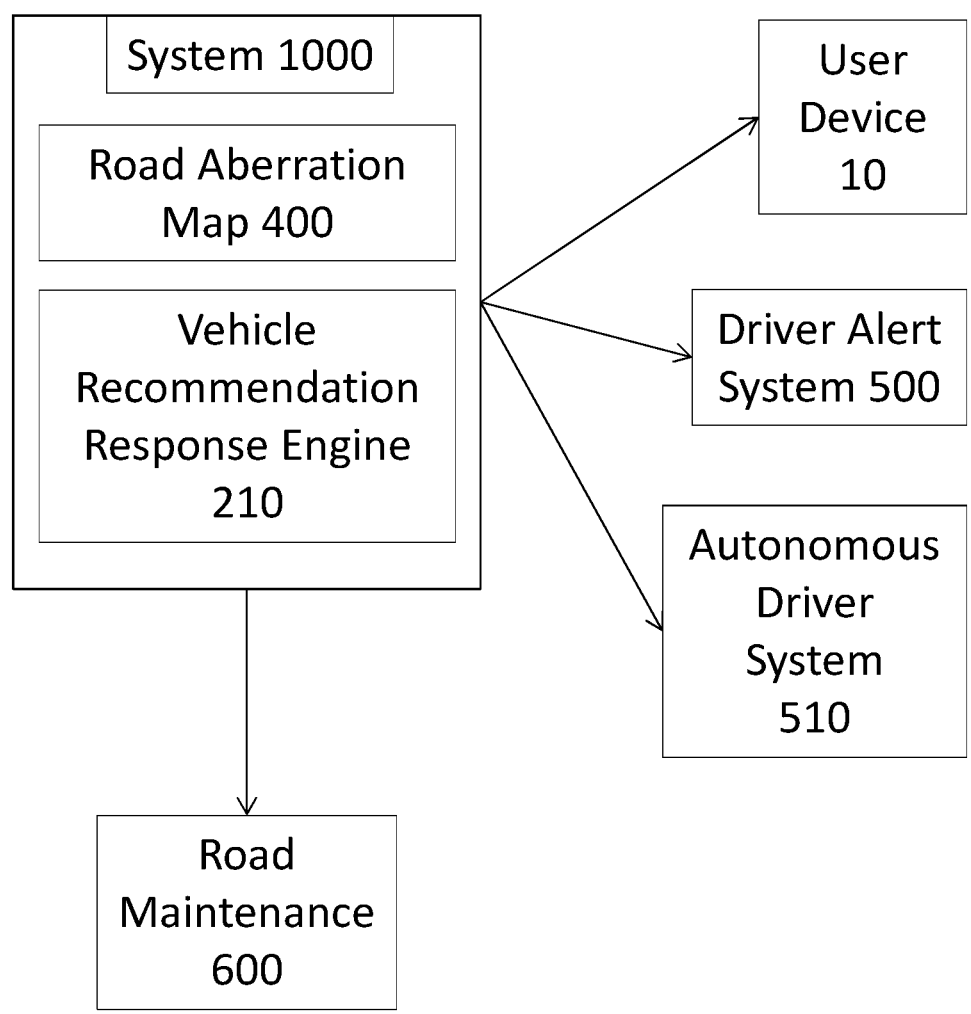
FIG. 5 provides a flow chart showing various outputs of a system according to an embodiment of the disclosure.

Referring now to FIG. 5, System 1000 provides output to one or more of user device 10, driver alert system 500, and autonomous driver system 510, any one or more of which is located in a user vehicle. The output is formatted and configured to cause an action selected from: a change in the user vehicle operation; a physical change to the user vehicle; and a change in a driver alert system within the user vehicle. The output is provided when the user vehicle (which contains a user device 10 or a built-in transceiver to receive instructions from the system) comes into proximity of an expected aberration (i.e., an aberration listed in the road aberration map 400). The term "in proximity" as used herein is meant to be variable depending on user input and/or conditional factors. For example, some users may wish to receive aberration information with more lead time before an encounter, whereas some autonomous driver systems may require very little lead time. Accordingly the system will allow the user or an algorithm to modify what qualifies as "in proximity". For example, in embodiments, "in proximity" means that the user vehicle is in the same road segment as an expected aberration. In embodiments, "in proximity" means that the user vehicle is in the same road segment, adjacent to the road segment, or within a fixed number or road segments (2, 3, 4, 5, etc.) of a road segment containing an expected aberration. The location of the user vehicle can be monitored, for example, by the GPS coordinates of the user device 10 in the user vehicle or a GPS device built-in to the user vehicle.

When the user vehicle comes into proximity of an expected aberration, system 1000 sends a communication configured to cause a change such as the examples that follow. The communication will include the location (e.g., GPS coordinates, or position within the road segment) of the expected road aberration, the type of road aberration expected at that location, and the recommended vehicle action as determined using the methods described herein. In one example, an autonomous driver system 510 in the user vehicle receives the communication and is made to automatically take the recommended vehicle action upon encountering the determined position of the expected aberration. In another example, a built-in driver alert system 500 (e.g., a head-up display, or an audio command system, or the like) in the user vehicle provides an alert to the driver of the user vehicle, the alert containing the type and location of the expected aberration as well as instructions for taking action based on the recommended vehicle action. In another example, a user device 10 can receive the communication and provide an audible and/or visual alert to the driver of the expected aberration. The system 1000 may further provide an output to road maintenance 600—i.e., a crew or entity responsible for fixing road aberrations (e.g., a governmental road authority). Such output can contain the expected aberration location and type.

In an aspect of the invention is an automatic road aberration detection method with automatic manoeuvre detection method when encountering aberrations and automatically collected and generated recommendations for maneuvers that drivers can take to minimize incidents and damage to vehicles. The systems and methods provide recommendations for manoeuvres, speeds, and changes in speeds. The invention provides automatic detection of road hazards from sensors in a mobile device such as a smart mobile phone. The invention generates several levels of feedback: (1) warning of approaching aberration; and (2) recommended vehicle maneuver response, among other possible feedbacks mentioned herein. In embodiments the invention relies on a proximity function to road aberrations for each user, hence doesn't allocate static areas in which the messages will propagate differently. The inventive methods use a proximity function in order to determine the proximity (i.e., distance of a user vehicle to an expected aberration) in which notifications should be sent.

The invention generates not only road hazard warnings but also manoeuvre recommendations on how to maneuver about an aberration. The invention does not require a pre-installed transport network to choose which specific cell tower should send the information.

The invention classifies road traffic accidents as aberrations. The invention provides an automated method for detecting and mapping road hazards, including traffic accidents. The invention provides an automatic method to learn and determine the best manoeuvre when approaching a road aberration based on the manoeuvres used by vehicles previously at the same location. The invention can be applied to vehicles of any type or any age, which is very relevant to drivers in resource constrained emerging economies, where many vehicles on the road are older. The invention also includes potential hazards created by vehicle and pedestrian interactions.

The invention collects cumulative real-time data and infers the best vehicular maneuvers to lessen the effects of roadway (infrastructure-based) hazards. The invention is capable of relying solely on sensors available in a common smartphone which most motorists have at their disposal.

In embodiments, when the user driver logs into the system it matches the user with their registered vehicle (this is data collected upon registration of the user). The system then informs a new user joining the system the optimal way to deal with an encountered road aberration, by determining and then communicating how others interacted with an aberration.

Recommended vehicle action includes three primary components: an amount of recommended braking, an amount of recommended accelerating, and an amount and direction of recommended steering. This information can be given to the driver via audio or head-up displays, or communicated to an autonomous driverless vehicle system.

The invention is different from prior methods in a variety of ways, including the following. The data collection method is a frugal method for resource constrained countries, where the invention is able to learn road surface conditions as well as vehicle maneuvers from mobile phone sensors. As a result it is possible to provide driver decision support to a number of stakeholders, specifically drivers. The method involves learning vehicle maneuvers as a result of poor road conditions. The invention provides an ability to provide geo-located road hazard warnings as well as recommended driver/vehicle response given the vehicle type, and contextual information (eg. time of day and weather). The invention has the following core technical implications and advantages: enables driver to be aware of the road hazards and provides recommendations, giving sufficient time to safely respond; improved road safety, vehicle controllability, and comfort; and autonomous vehicles can use the system to apply "cruise control" for upcoming hazards. The recommended vehicle action is determined based on other driver responses and filtered according to select set of vehicle features (vehicle type, age, performance capabilities, configuration, etc.), driver features (driver age, experience, etc.), and context (raining, at night, in heavy traffic, etc.).

A change in a driver alert system can include: change in a touch screen/head-up display; change in an audio alert; change in a vibration in a driver wearable device; a change in a driver alert inside the vehicle or attached to the driver. A change in vehicle operation may include a change in vehicle behavior, wherein vehicle operation can be defined as breaking, acceleration, turning or a combination of the three. A physical change to the vehicle includes a change in the physical status of a component of the vehicle, and also includes changes such as a mechanical reconfiguration of the vehicle's suspension system, for example.

In embodiments is provided a system comprising: one or more computer systems (i.e., processor and memory as described herein), one or more route contextual inputs (e.g. weather, vehicle type, time of day, road/route materials, road/route geometry, etc.), an aberration database of a plurality of records, each record describing an aberration along a route; a response database of a plurality of response records, each of the response records describing one or more aggregate/optimal traveler response to one of the aberration; and a warning process that notifies a user of one or more hazards to be encountered on one or more route and provides the user an optimal response to the aberration with respect to contextual inputs.

In embodiments is a system, as above, where the aberration includes one or more of the following: one or more aberrations to travelers along the route, one or more aberrations to people near the hazard as a result of the travelers, speed bumps, puddles, potholes, wash outs, storms, air pockets, "generate" hazard, etc.

In embodiments is a system, as above, where the routes include one or more of the following: a road, a sea-lane, an air route, a handicap access, delivery/pick up site, etc.

In embodiments is a system, as above, where the aberration dynamically changes in time (e.g. potholes getting larger to the point of washing out the road). In embodiments is a system, as above, where the aberration dynamically changes with context (e.g. clearness of views as darkness, fogs and rain, slipperiness as wetting and ice, staircase/ramp for wheel chair access, air turbulence, electrical storms, storm surges, pirates, traffic patterns/rush hour, etc.).

In embodiments is a system, as above, where the aberration (and their context) is placed on a map for display.

In embodiments is a system comprising: one or more computers (i.e., processor and memory as above), one or more contextual inputs (e.g. weather, vehicle type, time of day, road/route materials, road/route geometry, etc.), one or more kinematic inputs (e.g. position, velocity, acceleration, direction, GPS bases speed/acceleration/direction sensors) that measure a kinematic response of a vehicle to one or more route hazards at a hazard location, time, and hazard context; a ranking process that determines a degree of hazard at a time (e.g., more vehicles ran off of clay road in rain then in dry heat) for a context and a type of hazard/response (e.g., darkness→brighter headlights, need to avoid/swerve→slow down, etc.), (for example, a clay road might not be a hazard on a hot dry day but is slippery in rain; a sharp, blind curve might not be a hazard for a slow driver but would be for a fast driver, a road with potholes might be less of a hazard to a truck than to a small car and require different response—slow down versus avoid); and a selection process that choses one or more responses for the user that are optimal for the hazard degree and type in the context.

This is done from a prescribed, heuristic-based database but the system can also employ unsupervised learning (e.g. collaborative filtering) based recommendations (e.g., cluster a driver context into previous drivers and see the popular reactions in the cluster).

In embodiments, there is the system, as above, where the contextual and kinematic inputs are acquired by one or more of the following: cell phone, camera, user input, computer model, or the like. In embodiments, there is the system, as above, that determines degree of hazard for a context and an optimal (or popular) response.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

What is claimed is:

1. A method comprising:

communicating to a vehicle, in response to sensor data aggregated from a plurality of other vehicles, a probable geo-location of a road aberration and a recommended vehicle action for traversing the road aberration, wherein the communicating causes an action selected from: a change in the vehicle operation; a physical change to the vehicle; and a change in a driver alert system within the vehicle.

2. The method of claim 1, wherein the probable geo-location for the road aberration is determined from the sensor data aggregated from the plurality of other vehicles, and the recommended vehicle action is determined from aggregated sensor data.

3. The method of claim 1, wherein the probable geo-location for the road aberration is determined from the sensor data aggregated from the plurality of other vehicles, and the recommended vehicle action is determined from aggregated sensor data, and wherein the aggregated sensor data comprises geo-location and vehicle action data from a plurality of vehicles, each vehicle having encountered the road aberration.

4. A method comprising:

receiving from a plurality of vehicles, by a computer system via a network, sensor data pertaining to a road segment, wherein the road segment comprises a road aberration and wherein the sensor data from each of the plurality of vehicles corresponds to an encounter of the vehicle with the road aberration, and wherein the sensor data comprises geo-location data and vehicle action data;

producing aggregated sensor data by processing the sensor data in the computer system;

determining a probable geo-location for the road aberration by the computer system from the aggregated sensor data;

determining a recommended vehicle action for the road aberration by the computer system from the aggregated sensor data; and communicating to a vehicle positioned in the road segment or adjacent to the road segment the determined probable geo-location of the road aberration and the determined recommended vehicle action.

5. The method of claim 4, wherein the method further comprises adding the determined probable geo-location for the road aberration and the determined recommended vehicle action to a digital map comprising the road segment.

6. The method of claim 4, wherein the communicating causes an action selected from: a change in the vehicle operation; a physical change to the vehicle; and a change in a driver alert system within the vehicle.

7. The method of claim 4, wherein the communicating causes a change in the vehicle operation, and wherein the vehicle takes an action consistent with the determined recommended vehicle action.

8. The method of claim 4, wherein the communicating causes a mechanical reconfiguration of a physical component of the vehicle, and wherein the physical component is a suspension system of the vehicle.

9. The method of claim 4, wherein the sensor data for each of the plurality of vehicles is obtained from a mobile device disposed within the vehicle.

10. The method of claim 4, wherein the method further comprises adding the determined probable geo-location for the road aberration and the determined recommended vehicle action to a digital map comprising the road segment, and wherein the communicating causes an action selected from: a change in the vehicle operation; a physical change to the vehicle; and a change in a driver alert system within the vehicle.

11. The method of claim 4, wherein the method further comprises characterizing and labeling the road aberration according to the sensor data and wherein the communicating causes an action selected from: a change in the vehicle operation; a physical change to the vehicle; and a change in a driver alert system within the vehicle.

12. The method of claim 4, wherein the sensor data further comprises vehicle type information and wherein the communicating causes an action selected from: a change in the vehicle operation; a physical change to the vehicle; and a change in a driver alert system within the vehicle.

13. The method of claim 4, wherein the sensor data further comprises vehicle type information, and the determined recommended vehicle action is matched to a vehicle type of the vehicle positioned in the road.

14. The method of claim 4, wherein the sensor data further comprises vehicle type information, and wherein the method further comprises adding to a digital map the determined probable geo-location for the road aberration, and the determined recommended vehicle action indexed by vehicle type.

15. A computer system, comprising:

a processor; and a memory coupled to the processor, the memory configured to store program instructions executable by the processor to cause the computer system to implement:

receiving from a plurality of vehicles, by the computer system via a network, sensor data pertaining to a road segment, wherein the road segment comprises a road aberration and wherein the sensor data from each of the plurality of vehicles corresponds to an encounter of the vehicle with the road aberration, and wherein the sensor data comprises geo-location data and vehicle action data;

producing aggregated sensor data by processing the sensor data in the computer system;

determining a probable geo-location for the road aberration by the computer system from the aggregated sensor data;

determining a recommended vehicle action for the road aberration by the computer system from the aggregated sensor data; and communicating to a vehicle positioned in the road segment or adjacent to the road segment the determined probable geo-location of the road aberration and the determined recommended vehicle action.

16. The system of claim 15, wherein the system further comprises a digital map, and wherein the computer system is configured to add the determined probable geo-location for the road aberration and the determined recommended vehicle action to the digital map, and wherein the communication is configured to cause an action selected from: a change in the vehicle operation; a physical change to the vehicle; and a change in a driver alert system within the vehicle.

17. The system of claim 15, wherein the system is further configured to characterize and label the road aberration according to the sensor data and wherein the communication is configured to cause an action selected from: a change in the vehicle operation; a physical change to the vehicle; and a change in a driver alert system within the vehicle.

18. A method comprising:

communicating to a vehicle positioned in a road segment a probable geo-location of a road aberration and a recommended vehicle action, the road aberration being located in the road segment or adjacent to the road segment, the probable geo-location of the road aberration and the recommended vehicle action having been calculated from sensor data from a plurality of vehicles.

19. The method of claim 18, further comprising determining a feature selected from vehicle type, vehicle age, vehicle performance capability, driver age, driver skill, and environmental situation, and further comprising matching the recommended vehicle action with the determined feature.

20. The method of claim 18, wherein each of the plurality of vehicles is characterized by vehicle type, and wherein the method comprises forming a digital map of road aberrations and corresponding recommended vehicle actions from sensor data received from the plurality of vehicles, and wherein the communicating is initiated using a proximity function determining a distance of the vehicle from the road aberration.

* * * * *